United States Patent [19]
Harriman et al.

[11] Patent Number: 6,088,772
[45] Date of Patent: Jul. 11, 2000

[54] METHOD AND APPARATUS FOR IMPROVING SYSTEM PERFORMANCE WHEN REORDERING COMMANDS

[75] Inventors: David J. Harriman, Sacramento; Brian K. Langendorf, El Dorado Hills; Jasmin Ajanovic, Folsom, all of Calif.

[73] Assignee: Intel Corporation, Santa Clara, Calif.

[21] Appl. No.: 08/874,415

[22] Filed: Jun. 13, 1997

[51] Int. Cl.[7] .................................................. G06F 13/18
[52] U.S. Cl. ........................................ 711/158; 711/169
[58] Field of Search .................................... 711/158, 167, 711/168, 169, 154

[56] References Cited

U.S. PATENT DOCUMENTS

| 5,630,096 | 5/1997 | Zuravleff et al. | 711/154 |
| 5,638,534 | 6/1997 | Mote, Jr. | 711/158 |
| 5,666,494 | 9/1997 | Mote, Jr. | 711/167 |
| 5,701,503 | 12/1997 | Singh et al. | 711/126 |
| 5,758,051 | 5/1998 | Moreno et al. | 395/181 |
| 5,822,772 | 10/1998 | Chan et al. | 711/158 |
| 5,845,312 | 12/1998 | Kimura et al. | 711/105 |
| 5,857,086 | 1/1999 | Horan | 395/309 |
| 5,859,989 | 1/1999 | Olarig | 395/309 |
| 5,860,126 | 1/1999 | Mittal | 711/167 |

OTHER PUBLICATIONS

Intel Corporation, *Accelerated Graphics Port Interface Specification*, Revision 1.0, Jul. 31, 1996, pp. ii–x and 1–112.

*Primary Examiner*—John W. Cabeca
*Assistant Examiner*—Christopher S. Chow
*Attorney, Agent, or Firm*—Jeffrey S. Draeger

[57] ABSTRACT

A method and apparatus for ordering memory access commands. A command ordering circuit which is described includes a plurality of command slots which receive memory access commands. A page register stores a value indicating a last page accessed by a prior memory access command. Comparators compare the value in the page register to values stored in the command slots, and an arbiter receives outputs from the comparators and selects a command from one of the slots. According to the method described, memory accesses are reordered depending on the portion of memory accessed. A first memory access command requesting access to a first portion of memory is issued. Additional memory access commands also referencing the first portion of memory are issued until a count is reached. After the count is reached, a second memory access command which references a second portion of memory is issued.

27 Claims, 5 Drawing Sheets

METHOD AND APPARATUS FOR IMPROVING SYSTEM PERFORMANCE WHEN REORDERING COMMANDS

BACKGROUND OF THE INVENTION

FIELD OF INVENTION

The present invention pertains to the field of computer systems. More particularly, the present invention pertains to the field of ordering memory access commands in computer systems.

ART BACKGROUND

Decreasing memory access latencies in a computer system is one technique which generally improves overall system performance. Since computer systems often sequentially access consecutive memory locations, memory systems are frequently structured to provide lowest access times when such sequential access occurs. This may be accomplished, for example, by alternating between memory banks (one or more memory chips which reference a fixed amount of data such as a byte, word, or quadword) such that no bank is accessed two bus cycles in a row. Such bank switching affords each memory bank additional time to prepare for the next access cycle.

Additionally, improving overall locality of reference often increases memory access efficiency. Accesses to memory locations in close proximity are likely to remain within the same page or other similar memory structure defined by the operating system. Additionally, accessing the same memory structure is often preferred because the memory interface is usually optimized for accesses within that same memory structure. For example, in a paged memory system, accesses to the same page may allow a row address strobe (RAS) signal to remain active while the column address (CAS) is varied. Thus, efficiencies can result from both sequential and proximate (e.g., within the same page) memory accesses.

Reordering of read and write accesses is another optimization which may advantageously improve overall memory access bandwidth. Often, a bus agent such as a microprocessor posts write cycles to write buffers and allows read cycles to be reordered around these writes so long as no data conflict exists. Such reordering improves performance by deferring write accesses (if possible) until the bus is available. Grouping reads and writes may also reduce "turn around", the switching from reads to writes (or writes to reads) which is typically less efficient than repeating the same type of command.

One concern with a reordering scheme is the increased latency which inevitably results for commands delayed by the reordering. For example, if a microprocessor always preferred read commands over writes, the write commands may never be executed, thus having an infinite latency. In reality, an address conflict or an idle bus generally forces data from a microprocessor's write buffers. Many data transactions, however, demand a timely response rather than an indeterminate delay. Thus, if reordering is to be performed, it may be desirable to balance the increased bandwidth which may be obtained by optimally ordering commands against the increasing latency which may result from extended reordering sequences.

One memory access protocol which provides potentially reorderable memory access commands is described in the Accelerated Graphics Port (A.G.P.) Interface Specification, Revision 1.0, Jul. 31, 1996, available from Intel Corporation of Santa Clara, Calif. This protocol defines a set of commands intended to provide a high bandwidth channel between a bus master (typically a graphics accelerator) and main memory. While this specification provides command types, the implementation of memory controller arbitration, ordering, and queuing logic are limited only by general interfacing rules.

The A.G.P. specification defines normal and high priority read and write commands of varying lengths. The high priority commands should be completed within the chosen maximum or guaranteed latency time, but each data stream need only be ordered with respect to itself. For example, high priority reads must remain in order only with respect to other high priority reads. Thus, within each priority, read data is returned to the bus master, and write data is written to memory in the order requested. Additionally, data transfers are "disconnected" from associated access requests, meaning that other A.G.P. operations may separate an A.G.P. request and its associated data transfer. As is further described in the A.G.P. Specification, a fence command, among other things, limits reordering to within groups of normal priority commands between "fences". Thus, at least from the perspective of command groups, the fence command forces command ordering.

Thus, while the A.G.P. Specification dictates the order in which commands must complete, it does not specify the order in which data must be transferred between the memory controller and memory. The prior art does not provide an adequate command reordering mechanism which balances latency and bandwidth concerns while optimizing based on performance criteria such as locality of reference and/or command type. Consequently, a need has arisen for such a reordering mechanism to provide high bandwidth throughput with tolerable worst case latencies.

SUMMARY

A method and apparatus for ordering memory access commands is disclosed. A command ordering circuit which is described includes a plurality of command slots which receive memory access commands. A page register stores a value indicating a last page accessed by a prior memory access command. Comparators compare the value in the page register to values stored in the command slots, and an arbiter receives outputs from the comparators and selects a command from one of the slots.

According to the method described, memory accesses are reordered depending on the portion of memory accessed. A first memory access command requesting access to a first portion of memory is issued. Additional memory access commands also referencing the first portion of memory are issued until a count is reached. After the count is reached, a second memory access command which references a second portion of memory is issued.

BRIEF DESCRIPTION OF THE FIGURES

The present invention is illustrated by way of example and not limitation in the figures of the accompanying drawings.

DETAILED DESCRIPTION

The present invention provides a method and apparatus for reordering commands. In the following description, numerous specific details such as particular register arrangements, command types, and system configurations are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included functional descriptions, will be able to implement the necessary logic circuits without undue experimentation.

The present invention balances bandwidth improvements achieved by intelligent command reordering with the resulting increase in latencies for certain commands caused by this reordering. Memory accesses are reordered, if possible, so that sequential accesses fall within the same page, at least until a counter reaches a specified value. In one embodiment, the counter tracks the number of data elements transferred. Upon reaching the specified value, command ordering is forced by assuring that all presently queued instructions are executed before any subsequently received commands. Consequently, setting the specified value controls the maximum expected latency because it limits the number of commands which may be reordered around any given command.

Figure 1:
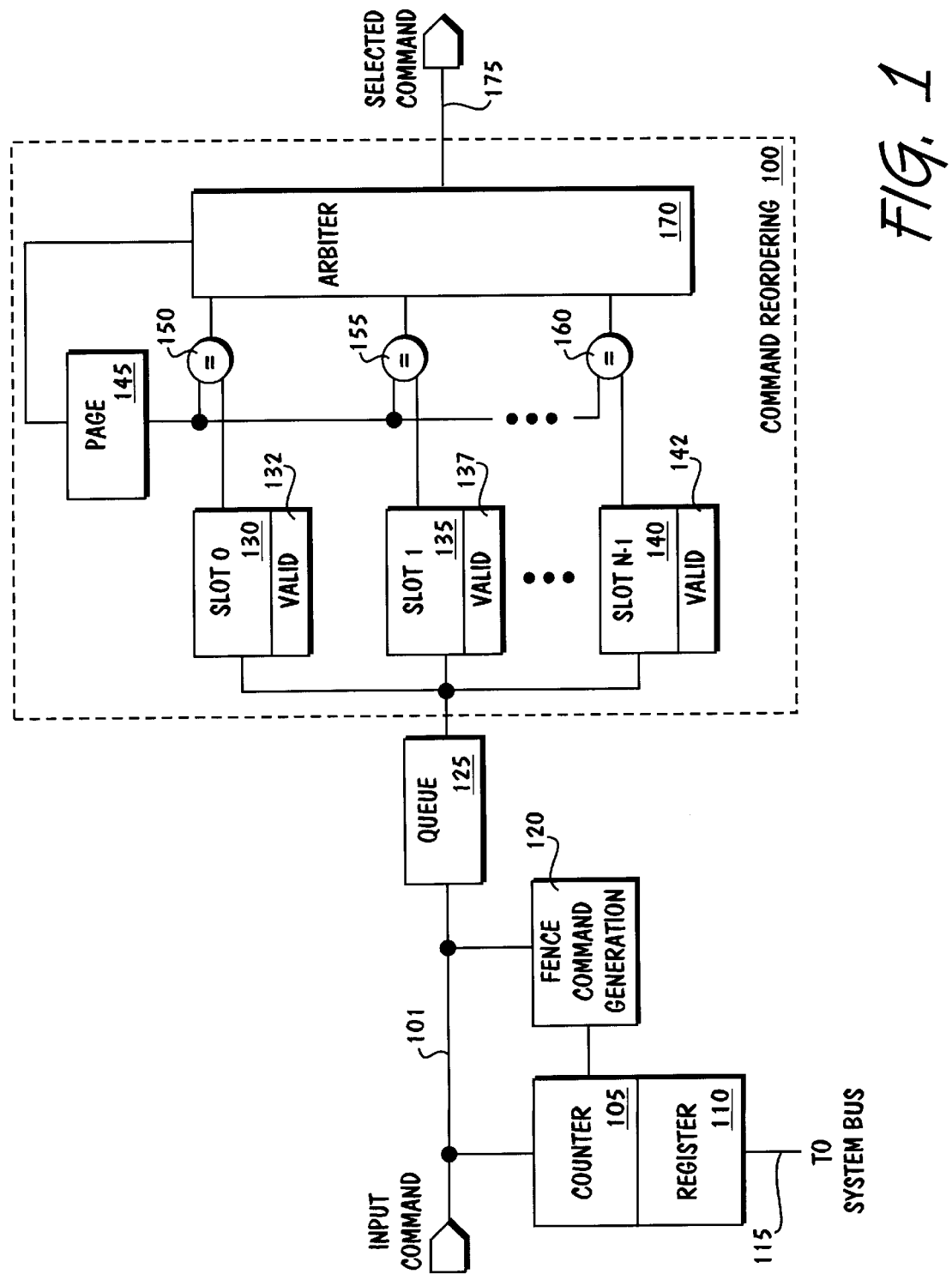
FIG. 1 illustrates one embodiment of an apparatus of the present invention for reordering commands in accordance with the teachings of the present invention.

FIG. 1 illustrates one embodiment of the invented apparatus. Input commands are received on an input line 101 and are queued in a queue 125. From the queue 125, a command reordering circuit 100 stores the commands in one of N command slots, as illustrated by command slots 130, 135, and 140. In other embodiments, commands may be directly stored into command slots or may be stored in a single buffer prior to being stored in command slots rather than passing through the queue 125.

A counter circuit 105 increments a counter at least once for each incoming command and compares the counter value to a value specified in a register 110. The register 110 may be written to via a connection 115 to a system bus. Alternately, the value may be more permanently selected by programming or hard-wiring the value into a storage or control circuit. A fence command generation circuit 120 is coupled to the counter circuit 105 and queues an ordering (fence) command into the queue 125 when the counter reaches the specified value. The ordering command precludes reordering queued commands in the queue 125 before the ordering command with any commands queued after the ordering command.

An arbiter 170 passes commands which it selects from the N command slots to an output port 175 for execution. The arbiter 170 first selects the oldest command which requests access to the same page as the previous command processed by the arbiter. If no commands match the previously accessed page, the oldest command accessing any page is selected. Several circuits assist the arbiter 170 in its selection, including a page register 145 which stores a value indicating a last page accessed by the previous command. Comparators 150, 155, and 160 respectively compare addresses of commands in slots 130, 135, and 140 to the last page value. Additionally, valid bits 132, 137, and 142 indicate whether each slot presently contains a valid command. If multiple valid commands match the last page accessed, the oldest command is selected.

In this embodiment, command age is indicated by the slot number the command is stored in. The lower the slot number, the older the command. This allows the arbiter 170 to select the oldest command when multiple commands match the last page accessed. Since commands may be selected from slots other than the youngest slot because the algorithm prefers older commands if possible, slot entries younger than the selected command need to be shifted one slot towards the first (lowest numbered) slot to fill the vacancy created by the selected command. This preserves the age information inherent in the slot positions and allows incoming commands from the queue 125 to be stored in the first slot which does not contain a valid command. In other embodiments, other age tracking mechanisms may be used. For example, each slot could maintain age bits which are tested each time a command is selected.

Figure 2:
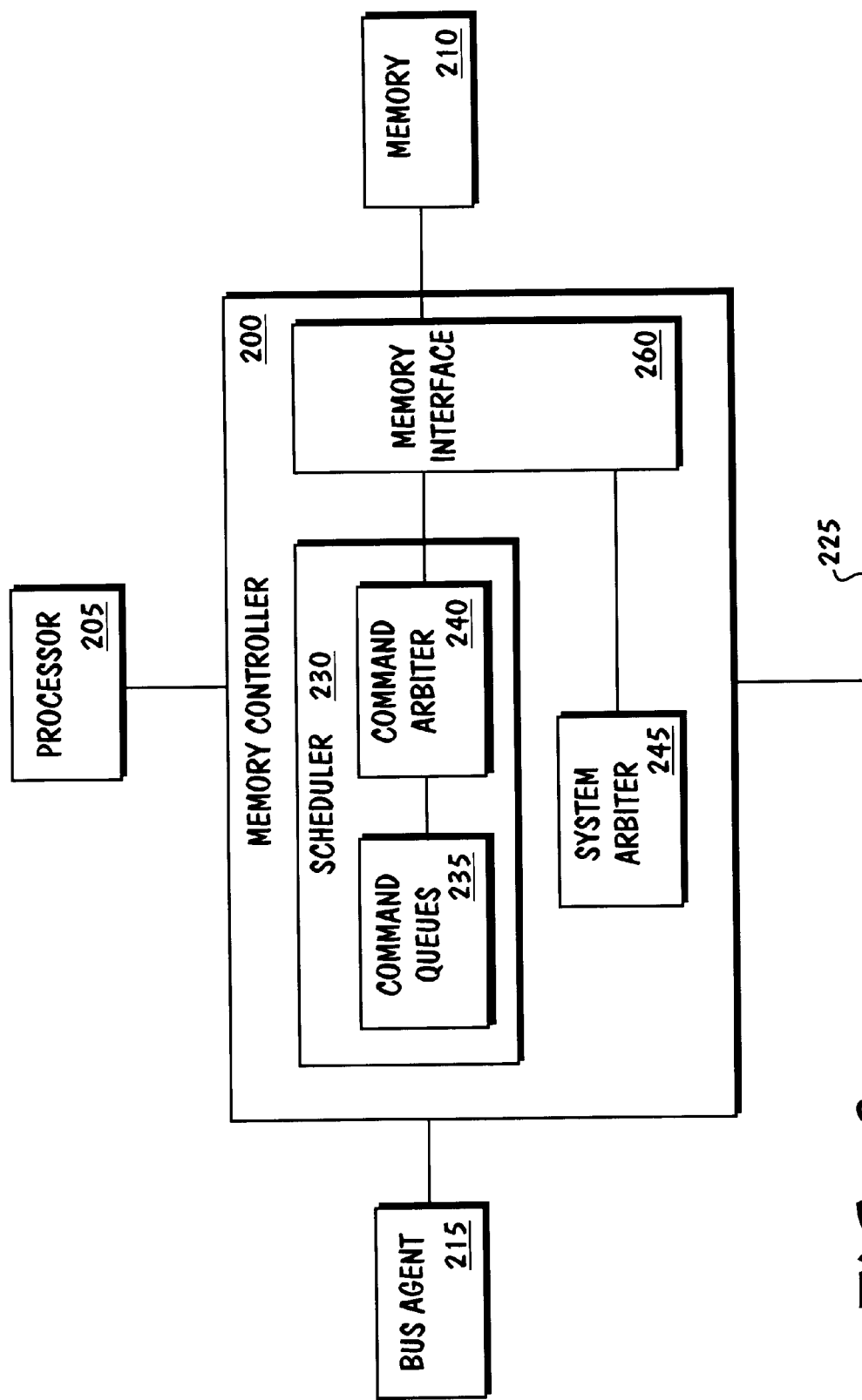
FIG. 2 illustrates one embodiment of a system in which the apparatus of FIG. 1 may be used.

One system in which the command reordering logic of FIG. 1 may be used is illustrated in FIG. 2. A memory controller 200 provides a processor 205, a system bus 225, and a bus agent 215 access to a memory 210. In one embodiment, the memory 210 is a dynamic random access memory system; however, in alternate embodiments, the memory 210 may be mechanical storage such as a hard drive or other input/output device, or may be an abstract memory space including disk space, static and/or dynamic memory, and other memory devices. In one embodiment, a system arbiter 245 handles a first type of command from the bus agent 215, the system bus 225, and the processor 205, while a scheduler 230 handles a second type of command from the bus agent 215. The scheduler 230 contains the reordering logic of FIG. 1 as indicated by a command arbiter 240 and command queues 235. In addition to the system shown in FIG. 2, the command reordering techniques discussed may be used in other system configurations which can tolerate reordering of memory access commands in order to improve throughput Commands selected by the command arbiter 240 are presented to a memory interface circuit 260, where they may also compete for access to the memory 210 with other commands from the processor 205 and the system bus 225. For example, in one embodiment, the bus agent 215 is a graphics accelerator which communicates with the memory controller 200 via the A.G.P. protocol. In this embodiment, the system arbiter includes logic to interface with the processor 205, a second interface of the bus agent 215, and any Peripheral Components Interconnect (PCI) bus agents on system bus 225.

The second interface of the bus agent 215 may allow a separate type of transaction (e.g., a FRAME# based transaction) to configure and send certain commands to the bus agent 215. FRAME# based transactions are initiated using the well known FRAME# signal as opposed to using, for example, the PIPE# signal described in the A.G.P. Specification.

Figure 3:
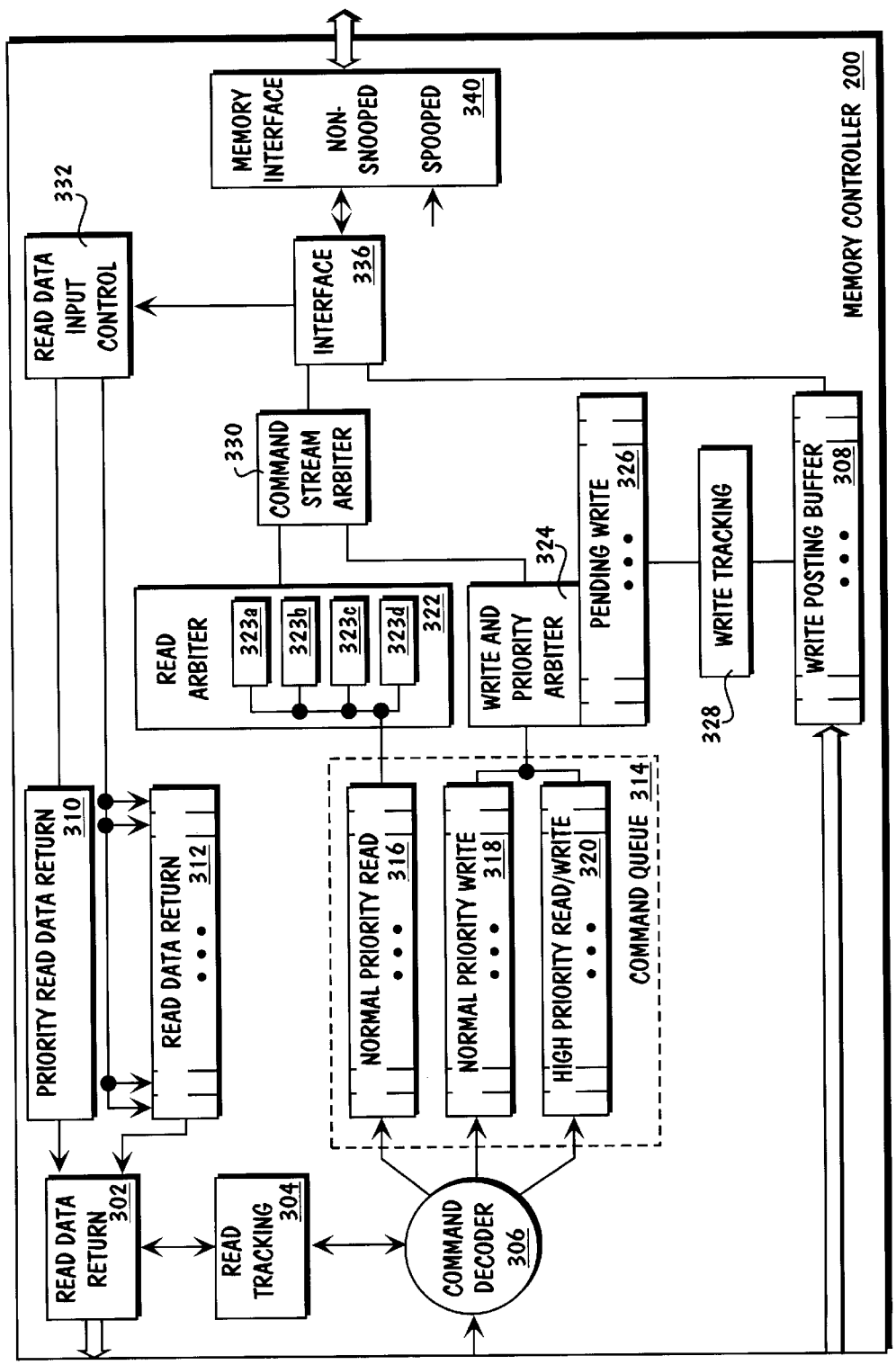
FIG. 3 illustrates details of one embodiment of the memory controller 200 of FIG. 2 which includes the command reordering circuitry of FIG. 1.

Further details of the memory controller 200 are shown in FIG. 3. The memory controller 200 includes a command decoder 306, which receives commands and decodes them for the command queue block 314. As illustrated, the command queue block has three separate command queues, a normal priority read queue 316, a normal priority write queue 318, and a high priority read and write queue 320.

Arbitration logic coupled to select commands from the command queue block includes a read arbiter 322, a write and priority arbiter 324, and a command stream arbiter 330. One embodiment of the read arbiter 322 includes the command reordering circuit 100 shown in FIG. 1 which allows reordering of normal priority read commands using four slots 323a–323d.

The write and priority arbiter 324 includes a pending write queue 326, which assures that the command stream arbiter 330 only selects write commands which have data available for execution. This additional circuitry is provided because a write command may be received by the command decoder 306 prior to the write data being received by a write posting buffer 308. The write and priority arbiter communicates with the write posting buffer 308 through a write tracking circuit 328 in order to determine which writes are available for selection and execution.

The write tracking circuit 328 also helps detect blocked write commands by alerting the write and priority arbiter 324 if there is insufficient space in the pending write queue 326 or if there is insufficient space in the write posting buffer 308 for the data associated with a write command at the head of the normal priority write queue 318 or the high priority read and write queue 320. In that case, the write and priority arbiter 324 may raise the priority of at least one write command in the pending write queue 326, in order to make space in the write posting buffer 308 for the incoming data. The write tracking circuit 328 ensures that the data from the write posting buffer 308 is passed along to an interface circuit 336 before the buffer location is overwritten with the incoming data.

The command stream arbiter cooperates with the read arbiter 322 and the write and priority arbiter 324 to select a cycle for execution. While all of the queues in the command queue block 314 may not be simultaneously accessible in this embodiment because the normal priority write and high priority read/write queues may have a single read port, multiple commands may still reach the command stream arbiter 330 and be available for execution in the same bus cycle. For example, the command stream arbiter 330 may need to choose between a normal priority read from the read arbiter 322, a high priority read available at the write and priority arbiter 324, and a high priority write from the pending write queue 326 also available at the write and priority arbiter 324 in the same clock cycle because its associated data arrived at the write posting buffer 308.

The command stream arbiter 330 passes commands to the interface circuit 336 which transforms commands to a format recognized by a memory interface circuit 340. In one embodiment, the interface circuit 336 receives A.G.P. commands, and the memory interface circuit 340 provides a Dynamic Random Access Memory (DRAM) interface. The memory interface circuit 340 also receives other system memory access requests such as processor or PCI requests. The A.G.P. input port to the memory interface 340 is labeled non-snooped because A.G.P. memory accesses do not provide memory coherency checks with other system components. On the other hand, PCI and/or processor memory accesses may include such coherency checks and are received at the snooped input port of the memory interface 340.

The interface circuit 336 also returns data from the memory interface 340 to a read data input control block 332. High priority data is returned in order and placed in a priority data return buffer 310. Normal priority read data, however, may be returned out of order if the read arbiter 322 alters the sequence of incoming reads prior to their execution. In this case, the read data input control block 332 places data in a particular location in a read data return buffer 312, such that the data reflects the original request order when the read data return buffer 312 fills. A read data return block 302 first selects priority read data from the priority read data return buffer 310 if available, and subsequently returns the properly ordered normal priority read data to the requesting bus agent. Read tracking logic 304 tracks read commands from the time they reach the command decoder 306 until the time the requested data is returned by the read data return block 302.

Figure 4:
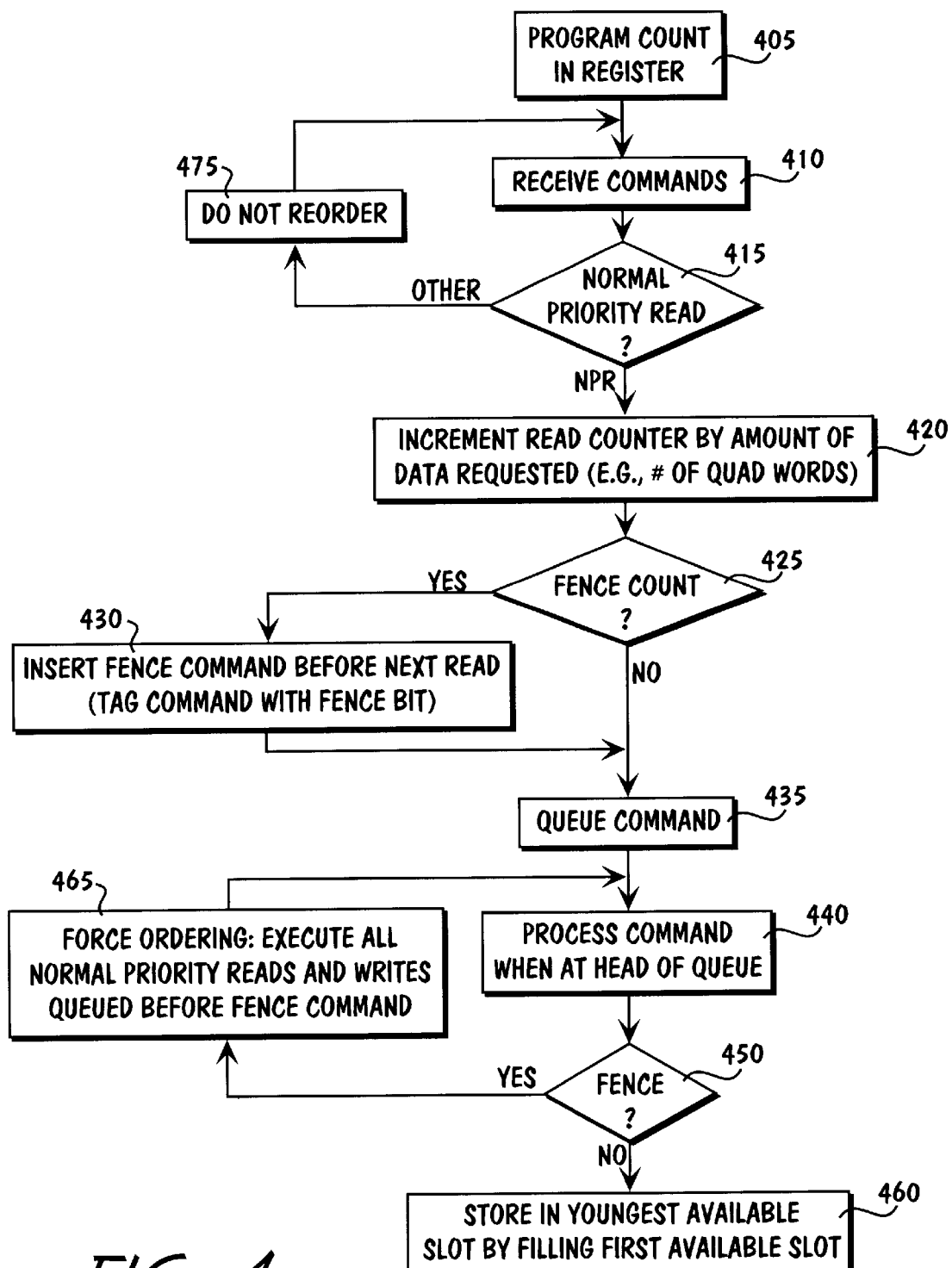
FIG. 4 illustrates a flow diagram of activities occurring in conjunction with the receipt of reorderable commands in one embodiment of the present invention.

FIG. 4 illustrates the sequence of activities performed by the memory controller 200 of FIG. 3 in an embodiment utilizing the reordering circuitry shown in FIG. 1. In step 405, at a time such as system initialization, a count is programmed into the register 110. As previously noted, this step may be performed when the memory controller is manufactured. Commands are received by the memory controller as shown in step 410, and the type is detected in step 415. If a command is not a normal priority read, the command reordering circuit 100 does not perform reordering in this embodiment as shown in step 475.

If the received command is a normal priority read, the counter circuit 105 increments its count by the number of data elements requested as illustrated in step 420. For example, in an A.G.P. implementation, the counter counts the number of quadwords requested by normal priority reads. Counting quadwords allows the reordering to achieve more uniform latencies than simply counting commands because A.G.P. commands vary in length (as indicated by three length bits and the A.G.P. command). In alternate embodiments, however, the number of commands could be tracked if commands are uniform in length or if uniform latencies are not of great importance.

The count programmed into the register during normal operation is typically determined using an initial estimate which is adjusted after system testing. The initial estimate may be determined by considering the maximum latency which is acceptable for the bus agent 215 and then translating that maximum latency into a count using the expected system cycle times for the particular system. An empirical approach using benchmark tests simulating expected system activity is then employed to adjust the count to compensate for additional system interactions which may delay memory accesses.

As shown in step 425, the counter circuit 105 tests whether the counter has reached the count programmed into the register 110. As illustrated in step 430, if the fence count has been reached, a fence command is added to the queue 125 before any subsequently received read commands. This forces the reordering of commands before the fence command to be contained only within those commands which were received before the fence command. Commands after the fence command may be reordered amongst themselves until a next fence command is received. In one embodiment, the fence command is inserted into the queue by tagging the command received when the count is reached with a bit indicating that the command is a fence command. Additionally, one embodiment queues a no operation (NOP) command which is also tagged as a fence command in the normal priority write queue 318.

As illustrated in step 435, the command, whether or not tagged as a fence command, is queued. The command is then processed by the reordering circuit 100 when it reaches the head of the queue as shown in step 440. Since the queuing and the processing (reordering) are typically performed by separate circuits (e.g., command decoder 306 and read arbiter 322 of FIG. 3), the reordering may occur while other commands are being queued. When a command at the head of the queue 125 is processed, it is tested to determine whether or not it is a fence command as shown in step 450. If the command is not a fence command, it is stored in the youngest available slot in the command ordering logic 100. In this embodiment, slot 0 is always the oldest slot, and slot N-1 is the youngest possible slot. The newly received command is stored in the slot closest to slot 0 which does not already contain a valid command. In other words, the first available slot is filled.

As indicated by step 465, if a fence command reaches the head of the queue 125, all of the commands in slots 0 through N-1 must be executed before others may be moved from the queue 125 to the command reordering circuit 100. This forces ordering of groups on opposite sides of the fence command by assuring that all commands within one group are issued before those in the next group. As also indicated in step 465, the fence command additionally forces writes in the normal priority write queue 318 to be executed prior to the execution of any normal priority commands which were received after the fence command was generated. The read arbiter 322 accordingly does not provide read commands to the command stream arbiter 330 until a signal (not shown) is received indicating that the tagged NOP command queued in step 430 has reached the head of the normal priority write queue 318. The result is that neither normal priority read nor write commands received after the fence command may be executed until both tagged commands have reached the respective queue heads. Once the tagged commands have reached the queue heads, and the commands prior to the tagged commands have been executed, the tagged commands are processed like untagged commands.

Any signal or command which forces ordering (or emptying of the reordering buffers) could be used in place of the fence command. The fence command, however, provides a convenient mechanism to produce the desired command ordering since it is independently required by the A.G.P. specification. In embodiments where the fence command is not used to force ordering of the reads, it is not necessary to also force execution of the write commands.

Figure 5:
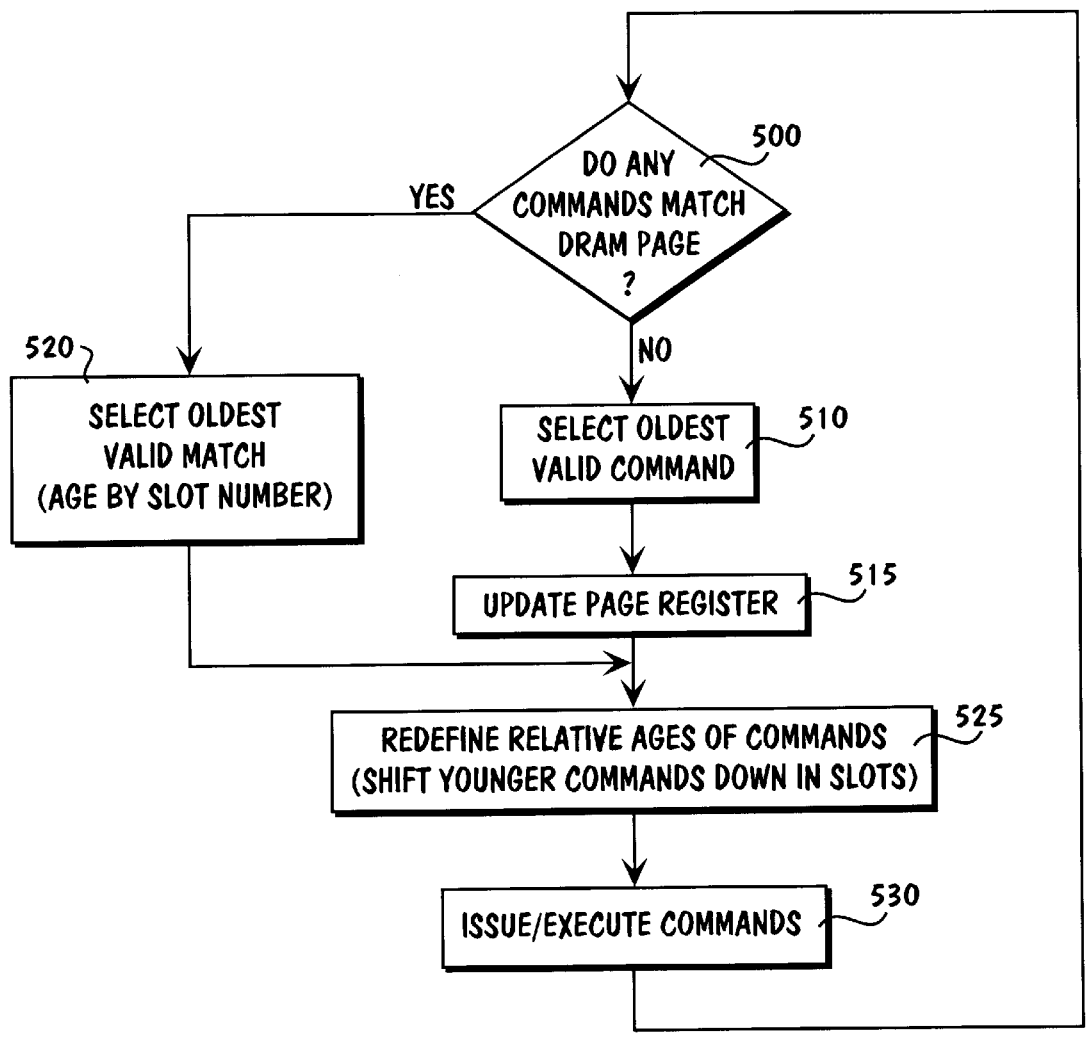
FIG. 5 illustrates one embodiment of an algorithm for selecting commands according to the present invention.

FIG. 5 illustrates one algorithm for selecting commands once they have been stored in one of the slots of the command reordering circuit 100. As shown in step 500, first the arbiter 170 determines if any of the stored commands match the present DRAM page. This is accomplished by analyzing the output signals from comparators 150, 155, and 160 which respectively indicate whether slots 130, 135, and 140 contain an address referencing the page indicated by a value contained in the page register 145. Additionally, the arbiter 170 tests the valid bits 132, 137, and 142.

In one embodiment, the current page value in the page register 145 only indicates the page of the last normal priority read processed by the command reordering circuit 100. In other embodiments, the page register 145 may be updated by any command processed by an entire memory controller such as the memory controller 200 shown in FIG. 2 and FIG. 3.

If no valid commands match the current page, the arbiter 170 selects the oldest valid command as shown in step 510. Since commands are stored in the first available slot as they are received, the oldest command is necessarily the command (if any) in the first slot 130. Since this command did not match the value stored in the page register 145 (as tested in step 500), the arbiter 170 updates the page register with the new value as shown in step 515.

In the case where the addresses referenced by one or more of the commands stored in the command reordering circuit 100 match the value indicated by the page register 145, the arbiter then selects the oldest matching entry as shown in step 520. Again, in this embodiment, the first entry (closest to slot 0) is the oldest entry.

In most cases where there are multiple commands stored in the slots of the command reordering circuit 100, the selection and execution of a command necessarily creates a gap or an empty slot. For example, if there are no commands matching the page register 145, the command from the first slot 130 is taken, leaving that first slot open. If new commands were stored in the first slot 130, the sense of temporal order inherent in the slot structure would be lost. Instead of losing this age information, as shown in step 525, commands are shifted down one slot, preserving the age ordering by redefining the relative age of all the shifted commands. Thus, if the command from slot 0 was selected and executed, the oldest command is now that which was stored in slot 1 and is now shifted to slot 0.

Finally, in step 530, the selected command is executed. While steps 525 and 530 are shown as sequential, they are typically performed by different circuits and thus may occur simultaneously or in the reverse order than that shown. For example, in the memory controller 200 shown in FIG. 2, the read arbiter 322 shifts the slot entries and the memory interface circuit 340 issues the command. Similarly, other steps described may be actually executed in a different order by their respective circuitries.

The method and apparatus of the present invention provides improved system performance by reordering commands. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method of ordering memory accesses comprising:
   issuing a first memory access command requesting access to a first portion of memory;
   issuing a plurality of memory access commands requesting access to said first portion of memory;
   forcing command group ordering because a count which is a function of the plurality of memory access commands requesting access to said first portion of memory is reached; and
   issuing a second memory access command requesting access to a second portion of memory.

2. The method of claim 1 wherein said first portion of memory is a first page of memory and said second portion of memory is a second page of memory.

3. The method of claim 1 further comprising:
   receiving said first memory access command;
   receiving said second memory access command; and
   receiving said plurality of memory access commands.

4. The method of claim 3 further comprising, prior to receiving, programming a register with said count.

5. The method of claim 3 wherein forcing command group ordering comprises:
   generating an fence command when said count is reached; and executing all normal priority read and write commands received before the fence command prior to executing any normal priority read and write commands received after the fence command.

6. The method of claim 3 wherein said first memory access command, said second memory access command, and said plurality of memory access commands are read commands, and wherein the step of forcing command group ordering comprises:

generating an ordering command when a first number of data elements have been requested.

7. A method of ordering commands comprising:
receiving a memory access command;
incrementing a counter in response to said memory access command;
generating an ordering command if said counter reaches a first number; and
storing said memory access command in one of a plurality of command slots which is a youngest available command slot.

8. The method of claim 7 wherein generating comprises tagging said memory access command with a fence bit.

9. The method of claim 7 wherein incrementing said counter comprises incrementing said counter once for each data element referenced by said memory access command.

10. The method of claim 8 wherein said memory access command is a read command and each data element referenced is a quadword of data requested by said read command.

11. The method of claim 7 further comprising selecting an oldest command matching a current page.

12. The method of claim 11 wherein said memory access command is an accelerated graphics port normal priority read command and said current page is a last page accessed by a previous accelerated graphics port normal priority read command.

13. The method of claim 11 further comprising selecting an oldest command if no commands matching the current page are available.

14. The method of claim 7 wherein storing said memory access command in said youngest available command slot comprises the step of storing said command in a first available slot from said plurality of command slots.

15. The method of claim 14 wherein selecting an oldest command comprises the step of selecting a first valid command from said plurality of command slots.

16. The method of claim 15 further comprising the step of shifting commands which are younger than a selected command toward a first of said plurality of command slots to fill a slot vacated by said selected command.

17. A command ordering circuit comprising:
a plurality of command slots coupled to receive memory access commands;
a page register capable of storing a value indicating a last page accessed;
a plurality of comparators, each one of said plurality of comparators being coupled to one of said plurality of command slots and said page register;
an arbiter circuit coupled to receive a plurality of comparator output signals and coupled to read a selected command from one of said plurality of command slots; and an ordering command generator circuit coupled to maintain a count based on memory access commands which have been received, wherein said ordering command generator circuit generates an ordering command separating groups of commands when said count based on said plurality of memory access commands reaches a first value.

18. The command ordering circuit of claim 17 wherein said selected command addresses the last page accessed as indicated by said page register.

19. The command ordering circuit of claim 17 wherein said arbiter circuit is coupled to first select an oldest command addressing the last page accessed.

20. The command ordering circuit of claim 19 wherein a first of said plurality of command slots stores an oldest command and a last of said plurality of command slots stores a youngest command.

21. The command ordering circuit of claim 20 wherein said plurality of command slots are serially coupled to shift commands younger than said selected command when said selected command is executed.

22. The command ordering circuit of claim 19 wherein said arbiter circuit selects an oldest command accessing a page different than the last page accessed if all of said plurality of command slots which contain valid commands contain commands accessing pages different than the last page accessed.

23. A system comprising:
a memory containing a plurality of data elements stored at a plurality of memory locations in said memory;
a bus agent configured to generate a plurality of read commands requesting said plurality of data elements;
a processor; and
a memory controller coupled to said bus agent, said memory, and said processor to reorder said plurality of read commands from said bus agent based on said plurality of memory locations and to maintain a count based on said plurality of read commands while reordering said plurality of read commands and to generate a group ordering command when a first value is reached.

24. The system of claim 23 wherein said count is a number of quadwords requested by said plurality of read commands and wherein said first value is stored in a register of said memory controller.

25. The system of claim 23 wherein said memory controller first is further configured to select an oldest read command to a last page indicated by a page register if such a command exists, and wherein said memory controller is further configured to otherwise select an oldest command to a different page.

26. The system of claim 23 wherein said bus agent is a graphics accelerator and said plurality of memory access commands are accelerated graphics port normal priority read commands.

27. The system of claim 23 wherein said memory controller further comprises a system arbiter configured to process memory access commands from said processor.

* * * * *